United States Patent [19]
Cate

[11] Patent Number: 6,164,774
[45] Date of Patent: Dec. 26, 2000

[54] EYEGLASSES WITH MAGNETIC ATTACHMENT LENS

[75] Inventor: Jonathan M. Cate, Denver, N.C.

[73] Assignee: United Syntek Corporation, Denver, N.C.

[21] Appl. No.: 09/398,671

[22] Filed: Sep. 17, 1999

[51] Int. Cl.$^7$ .................................................. G02C 9/00
[52] U.S. Cl. ............................................. 351/47; 351/57
[58] Field of Search .................. 381/47, 57, 48, 381/58, 41, 44

[56] References Cited

U.S. PATENT DOCUMENTS

| | | |
|---|---|---|
| 2,737,847 | 3/1956 | Tesauro . |
| 4,196,981 | 4/1980 | Waldrop . |
| 5,181,051 | 1/1993 | Townsend et al. . |
| 5,243,366 | 9/1993 | Blevins . |
| 5,416,537 | 5/1995 | Sadler . |
| 5,568,207 | 10/1996 | Chao . |
| 5,627,608 | 5/1997 | Chao . |
| 5,642,177 | 6/1997 | Nishioka . |
| 5,682,222 | 10/1997 | Chao . |
| 5,696,571 | 12/1997 | Spencer et al. ........................... 381/47 |
| 5,737,054 | 4/1998 | Chao . |
| 5,764,333 | 6/1998 | Somsel . |
| 5,882,101 | 3/1999 | Chao ........................................ 351/47 |

*Primary Examiner*—Hung Xuan Dang
*Attorney, Agent, or Firm*—Kennedy Covington Lobdell & Hickman, L.L.P.

[57] ABSTRACT

A combination eyeglass frame and attachment frame which includes two pairs of magnets, one pair being mounted on the inside surface of the temples of the eyeglass frame and the other pair being mounted at the ends of the attachment frame. The attachment frame is provided with a bridge member and wire members which mechanically support and hold the attachment frame magnets in place, and the attachment frame bridge member and wire members are positioned relative to the attachment frame magnets to engage the bridge member and upper edge portion of the eyeglass frame, respectively, when the attachment frame is mounted in place on the eyeglass frame.

6 Claims, 5 Drawing Sheets

EYEGLASSES WITH MAGNETIC ATTACHMENT LENS

BACKGROUND OF THE INVENTION

The present invention relates to eyeglasses that have attachment lens, and more particularly, to eyeglasses that utilize magnets to hold the attachment lens in place while permitting the user to easily remove the attachment lens when desired.

It is often desirable for someone who wears eyeglasses to be able to selectively attach auxiliary lens to such eyeglasses, when desired. For example, someone who wears eyeglasses that have prescription lens may want to add auxiliary lens in the form of sunglasses. Since the user may want to change the auxiliary lens frequently, depending upon where the user is, it is imperative that the auxiliary lens be easily mounted on the eyeglasses and easily removed therefrom, as necessary. It is also highly desirable that the auxiliary lens be securely held in place on the eyeglasses when mounted thereon so that the auxiliary lens will not accidentally fall off while in use. This requirement becomes even more important when the eyeglasses are being worn by a user involved in sports or other activities that put a strain on the mounting arrangement of the auxiliary lens.

There are a wide variety of mechanical attachment mechanisms which, in most cases, hold the auxiliary lens securely in place, but these mechanisms are sometimes difficult and time consuming to operate, and they are subject to malfunction if some part of the mechanism becomes bent or otherwise damaged during use.

It is also known to provide magnetic connections between the eyeglasses and the auxiliary lens, and while these connections are usually easier to use than mechanical mounting arrangements, they may not provide a connection that is as secure as may be desired. For example, U.S. Pat. No. 5,416,537 discloses an eyeglass frame that has magnets embedded in the front face thereof, and the frame of the attachment lens is provided with protruding magnets that engage the embedded magnets to hold the attachment lens in place. In this arrangement, when the eyeglasses are being worn, the abutting surfaces of the two sets of magnets lie in a vertical plane, and provide the only means of support for the attachment lens. Therefore, the entire weight of the attachment lens must be borne solely by the abutting vertical faces of the magnets, and any activity of the wearer which results in up-and-down movement of the head of the user creates an additional load on the magnetic connection. If the magnets are made large enough to have sufficient magnetic force to hold the attachment lens securely in place, then it may be difficult for the user to overcome this large magnetic force when the user desires to detach the attachment lens.

In an effort to overcome the disadvantages of the aforesaid magnetic mounting, it has been proposed in U.S. Pat. No. 5,568,207 to arranged one of the sets of magnets on the eyeglass frame so that the magnetically engaging surface thereof lies in a horizontal plane in normal use, and the magnets on the attachment lens rest on the eyeglass magnets during engagement therewith. While this arrangement provides better support for the attachment lens by avoiding the vertically positioned surfaces of the aforesaid U.S. Pat. No. 5,416,537, the attachment lens are still held in place solely by the magnetically engaging surfaces, and are, therefore, still prone to being accidentally dislodged from the eyeglass frame, particularly by forces acting on the attachment lens in the horizontal plane of the magnetic engagement.

Accordingly, there is a need for a combination eyeglass frame and attachment lens which will have a secure magnetic and mechanical attachment between the two elements, while still permitting the attachment lens to be easily removed, when desired.

SUMMARY OF THE INVENTION

The present invention provides a combination eyeglass frame and attachment lens selectively-mountable thereon, which includes an eyeglass frame having a pair of lens mounted therein, and a pair of temples mounted at the sides of the eyeglass frame and arranged to extend rearwardly therefrom for holding the eyeglass frame on the head of a user. A first pair of magnets are mounted on the eyeglass frame. An attachment frame is provided which has a pair of lens mounted therein which correspond generally in shape to the lens in the eyeglass frame. A second pair of magnets are mounted on the attachment lens frame at a location for magnetically engaging the first magnets and positioning the attachment lens juxtaposed the lens in the eyeglass frame and holding the attachment frame in place thereat. The attachment frame has at least one portion thereof resting on a top surface of the eyeglass frame when the first and second pairs of magnets engage each other to thereby provide additional mechanical support for the attachment frame on the eyeglass frame.

In the preferred embodiment of the present invention, the eyeglass frame and the attachment each include two rim portions for mounting the eyeglass and attachment lens therein, respectively, and a bridge member is connected to the two rim portions and extends therebetween. The bridge member on the attachment frame is preferably positioned relative to the second pair of magnets to engage the bridge member on the eyeglass frame when the first and second pairs of magnets are magnetically engaged. In the preferred embodiment of the present invention, the bridge member on the attachment frame includes a first portion that engages the top side of the bridge member of the eyeglass frame, and a second portion extending generally perpendicularly downwardly from the first portion to engage the back side of the bridge member of the eyeglass frame to assist the first and second pairs of magnets in mechanically securely holding the attachment frame in place on the eyeglass frame.

Additionally, the first pair of magnets may each include a flat, magnetically-engaging surface portion that lies in a plane generally parallel to the inside surfaces of the temple upon which it is mounted, and the second pair of magnets may each include a flat, magnetically-engaging surface portion. The attachment frame may include a pair of wire members extending outwardly therefrom and supporting the second pair of magnets at a position that will permit the flat, magnetically-engaging surfaces of the first and second pairs of magnets to engage each other and hold the attachment frame in place on the eyeglass frame. Also, the magnet supporting wire members are preferably positioned on the attachment frame so as to rest on the top edge of the eyeglass frame when the first and second pairs of magnets engage each other to thereby provide additional mechanical support for the attachment frame.

DESCRIPTION OF THE PREFERRED EMBODIMENT

Figure 1:
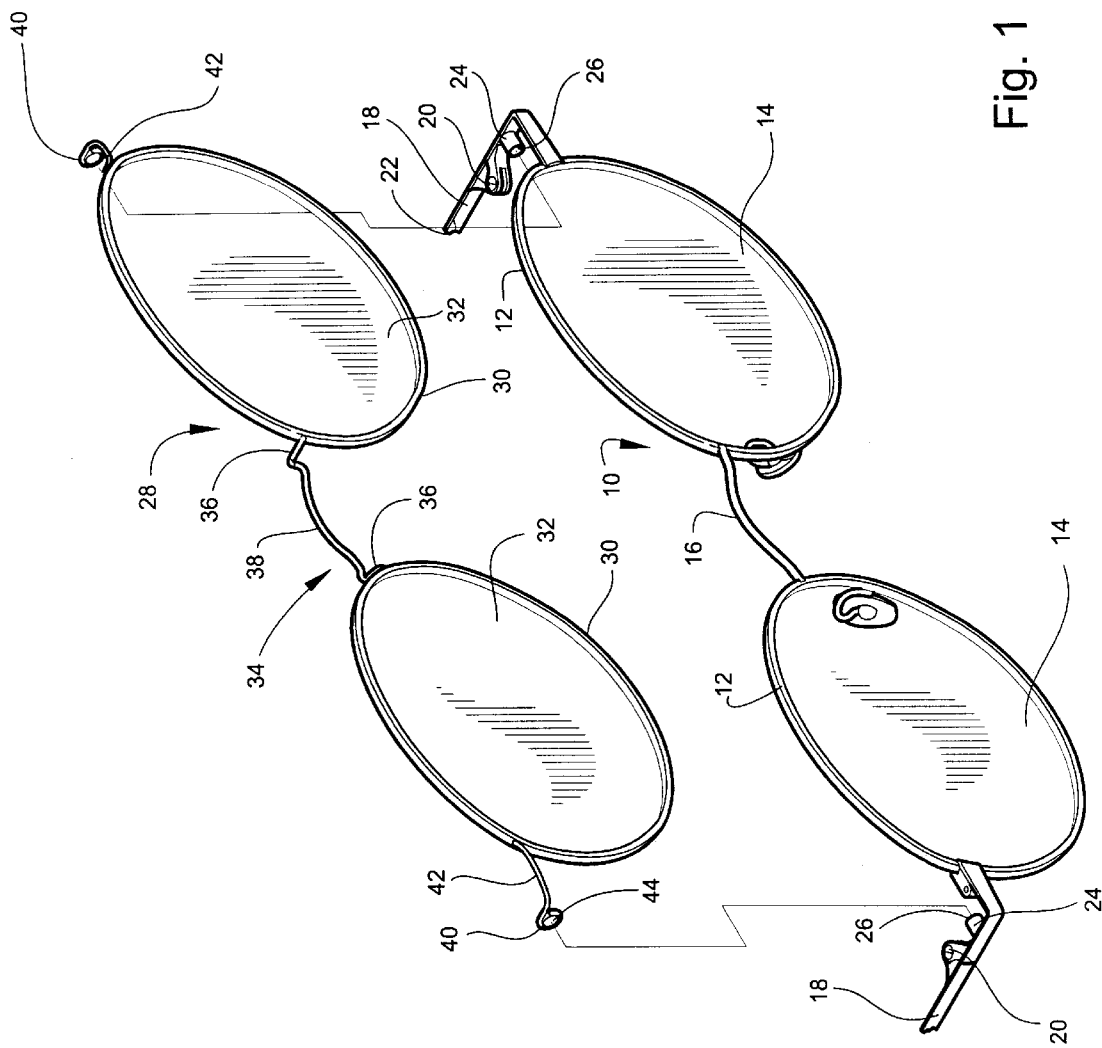
FIG. 1 is an exploded perspective view of the eyeglasses with attachment lens according to the present invention.

Looking now in greater detail at the accompanying drawings, the present invention includes an eyeglass frame 10 formed with two rim portions 12, each having a primary lens 14 mounted therein. A bridge member 16 is connected to the two rim portions and extends therebetween in conventional fashion. A pair of temples 18 are mounted at the sides of the eyeglass frame 10 by conventional hinges 20, and the temples 18 are arranged to extend rearwardly from the hinges 20 for holding the eyeglass frame 10 on the head of a user, again in a conventional manner.

Each of the frames 10 include a generally flat inside surface portion 22, and a first pair of generally round magnets are mounted on the inside surface portions 22 of the two temples 18, respectively. Each of the first pair of magnets 24 has a generally flat surface portion 26 that lies in a plane generally parallel to the inside flat surface 22 of the frames 10.

An attachment frame 28 is formed with two rim portions 30, each having an auxiliary lens 32 mounted therein, and a bridge member 34 is connected to the rim portions 30 and extends therebetween. The bridge member 34 is formed with a first engagement portion 36 for engaging the top side of the eyeglass frame bridge member 16, and a second engagement portion 38 extending generally perpendicularly downwardly from the first engagement portion to engage the back side of the bridge member 16 of the eyeglass frame 10, all in a manner to be described in greater detail presently.

A second pair of magnets 40 are mounted in a pair of wire members 42 that extend outwardly from the ends of the attachment frame 28, and each of the magnets 40 include a generally flat surface portion 44.

As best seen in FIGS. 2–5, the bridge member 34 of the attachment frame 28 is positioned relative to the magnets 40 on the attachment frame 28 so as to cause the first and second engagement portions 36, 38 on the attachment frame bridge member 34 to engage the top and back sides of the eyeglass frame bridge member 16 when the generally flat surfaces of the two pairs of magnets 24, 40 engage one another.

Similarly, the wire holding members 42 are positioned relative to the magnets 40 on the attachment frame 28 so as to rest in surface contact with the upper edge portion of the eyeglass frame 10 when the flat surface portions 26, 44 of the two pairs of magnets 24, 40 are in engagement with one another.

By virtue of the above-described arrangement, it will be apparent that the eyeglass frame 10 and attachment frame 28 of the present invention provide a combination of advantageous features which make it easy for the user of the present invention to quickly and easily mount the attachment frame 28 on the eyeglass frame 10, and, when mounted in place, the attachment frame 28 will be securely held in place on the eyeglass frame 10 during use, while still permitting the attachment frame 28 to be removed from the eyeglass frame 10 when desired.

Figure 2:
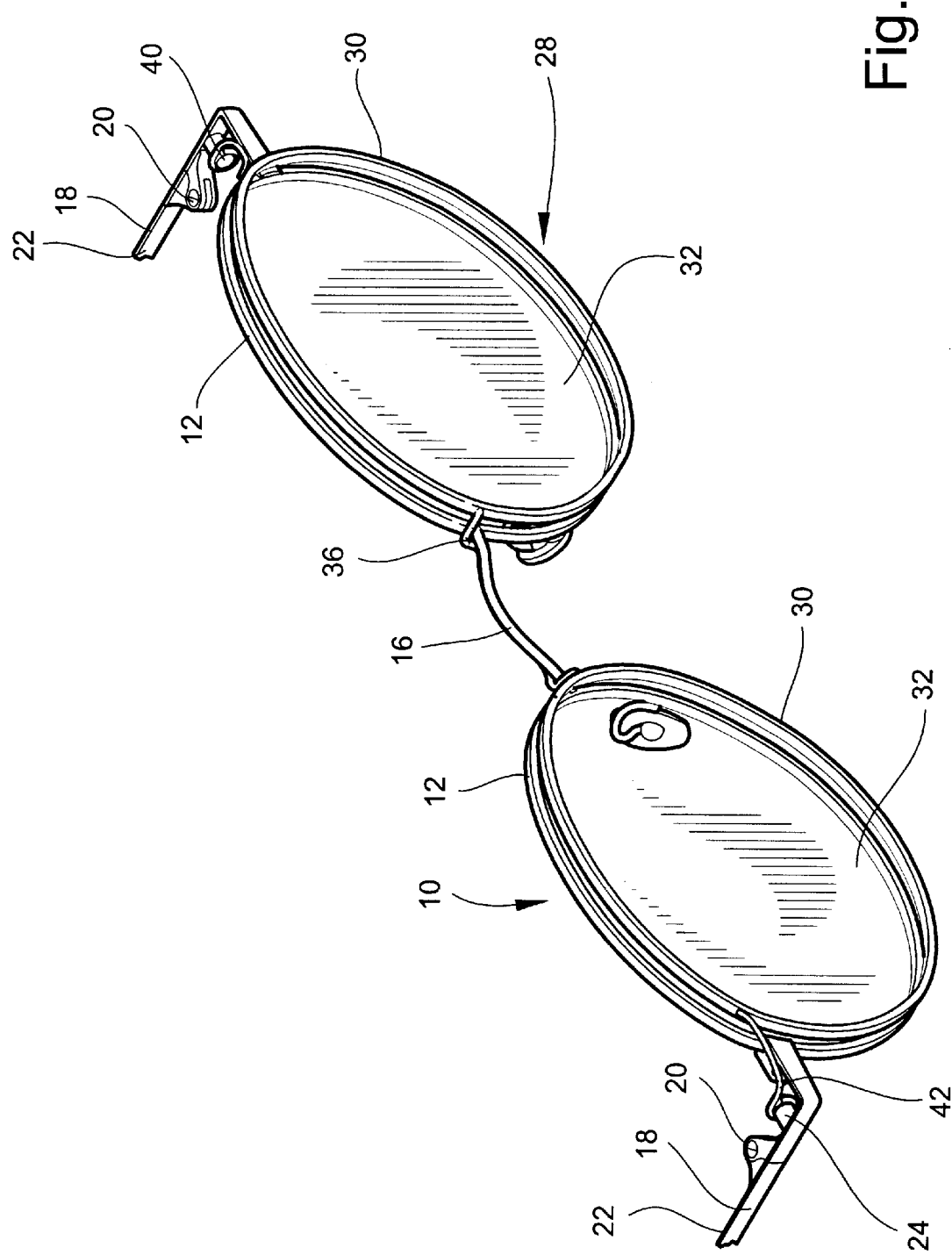
FIG. 2 is a perspective view similar to FIG. 1 but illustrating the attachment lens mounted in place on the eyeglass frame.
Figure 3:
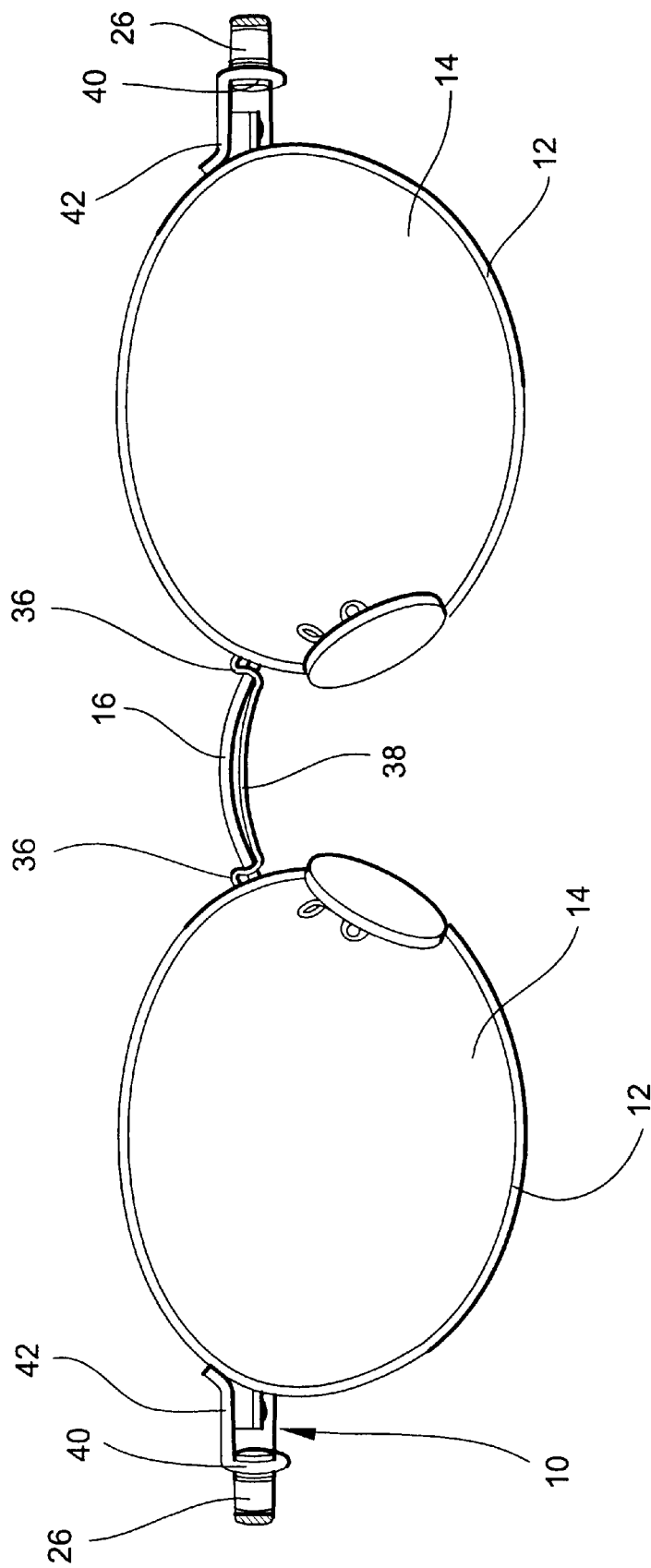
FIG. 3 is a front view of the eyeglass frame and attachment lens shown in FIG. 2.
Figure 4:
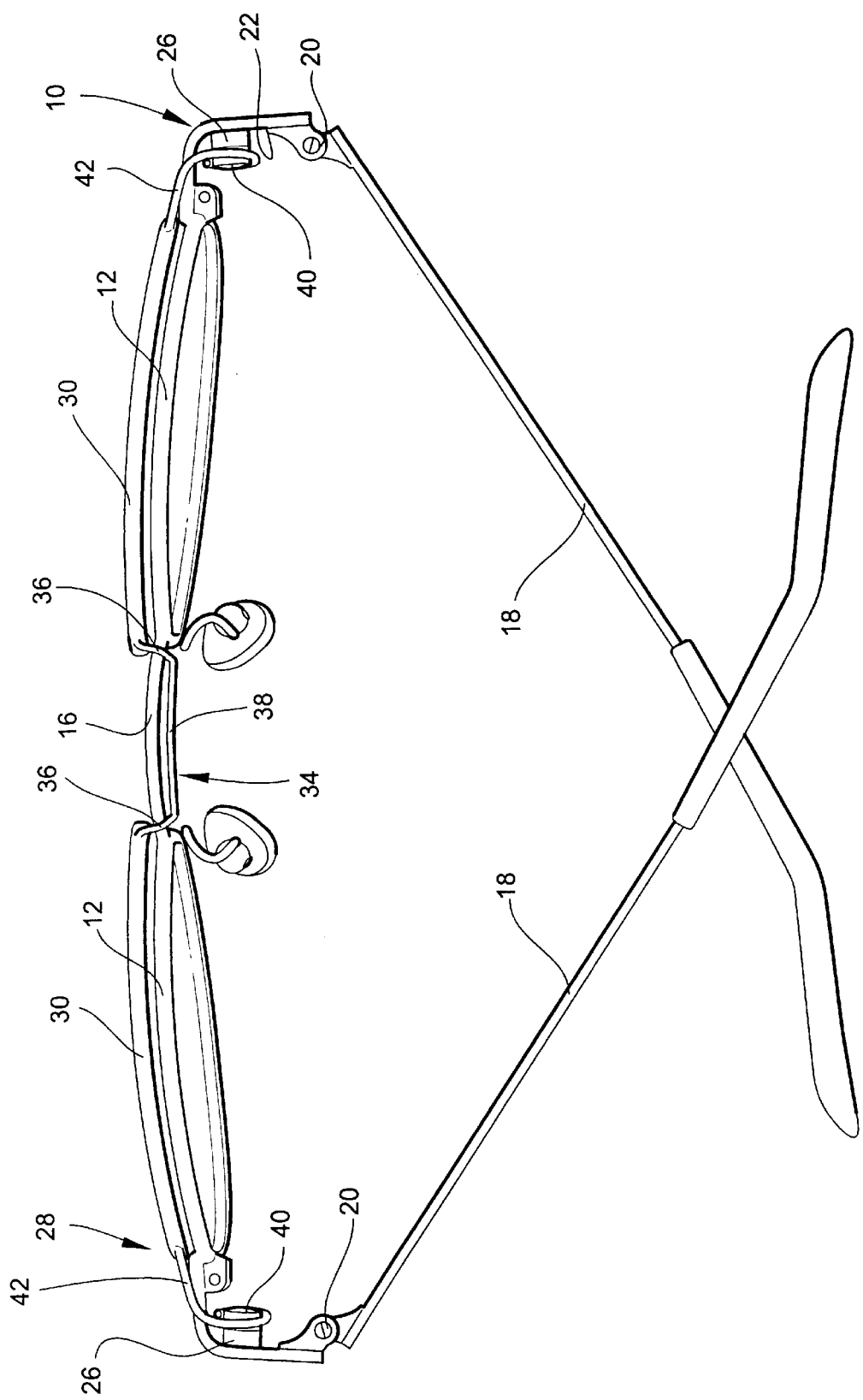
FIG. 4 is a top view of the eyeglass frame and attachment lens shown in FIG. 2.
Figure 5:
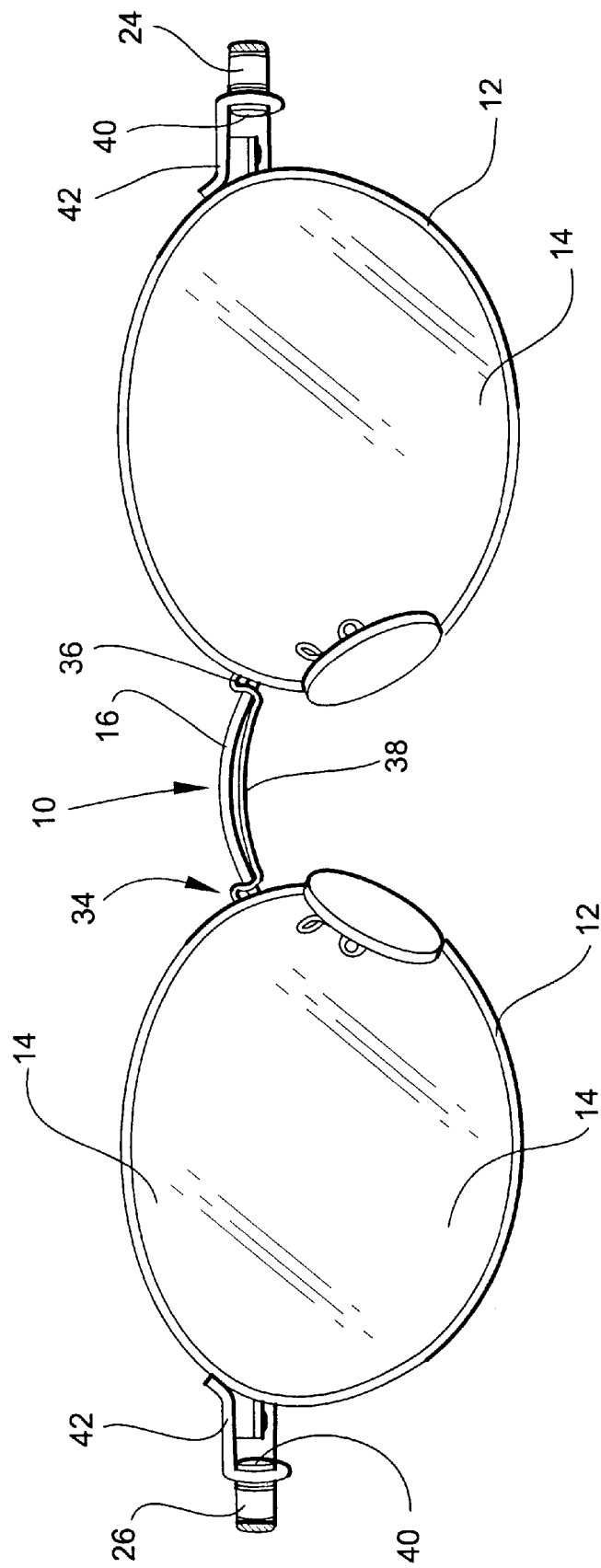
FIG. 5 is a front view of the eyeglass frame and attachment lens shown in FIG. 2.

More specifically, and looking particularly at FIGS. 1 and 2, the vertical disposition of the inside surface portions 22, 44 of the two pairs of magnets 24, 40 permit the user to essentially drop the attachment frame 28 onto the top of the eyeglass frame 10, and, because of the relationship of the bridge member 34 and the wire holding members 42 relative to the magnets 40, the first and second engagement portions 36, 38 of the attachment frame bridge member 34 will automatically engage the top and rear surfaces of the eyeglass frame bridge member 16. At the same time, the wire holding members 42 will engage and rest upon the top edge of the eyeglass frame 10. Therefore, as the attachment lens frame 28 is dropped into place, the aforesaid arrangement of the attachment frame bridge member 34 and the wire holding members 42 will, when they engage the eyeglass frame 10, not only properly locate the flat surface portions 44 of the magnets 40 with the corresponding flat surface portions 26 of the magnets 24, they will also act to assist the two pairs of magnets 24, 40 to securely hold the attachment frame 28 in place on the eyeglass frame 10 during use. However, because the aforesaid securing portions of the attachment frame 28 are disposed at the top surface of the eyeglass frame 10, it is a relatively simple matter for the user to grasp the attachment frame 26 and lift it off of the eyeglass frame 10 until the two pairs of magnets 24, 40 are disengaged.

It will therefore be appreciated that the present invention offers a combination of an eyeglass frame 10 and an attachment frame 28 which are easy to use, and yet the attachment frame 28 will be securely held in place on the eyeglass frame 10 when the attachment frame 28 is mounted in place on the eyeglass frame 10 both mechanically and magnetically.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A combination eyeglass and attachment lens selectively mountable thereon, comprising:

(a) an eyeglass frame having a pair of lens mounted therein;

(b) a pair of temples mounted at the sides of said eyeglass frame and arranged to extend rearwardly therefrom for holding said eyeglass frame on the head of a user;

(c) a first pair of magnets mounted on said eyeglass frame;

(d) an attachment frame having a pair of lens mounted therein which correspond generally in shape to said lens in said eyeglass frame;

(e) a second pair of magnets mounted on said attachment lens frame at a location for magnetically engaging said first magnets and positioning said attachment lens juxtaposed said lens in said eyeglass frame and holding said attachment frame in place thereat; and (f) said attachment frame having at least one portion thereof resting on a top surface of said eyeglass frame when said first and second pairs of magnets engage each other to thereby provide additional mechanical support for said attachment frame on said eyeglass frame.

2. A combination eyeglass and attachment lens as defined in claim 1, wherein said first pair of magnets are mounted on the inside surface of said temples.

3. A combination eyeglass and attachment lens as defined in claim 2, wherein said bridge member on said attachment frame includes a first portion that engages the top side of said bridge member of said eyeglass frame, and a second portion extending generally perpendicularly downwardly from said first portion to engage the back side of said bridge member of said eyeglass frame to assist said first and second pairs of magnets in securely holding said attachment frame in place on said eyeglass frame.

4. A combination eyeglass and attachment lens as defined in claim 2, wherein said first pair of magnets each include a flat magnetically engaging surface portion that lies in a plane that is generally parallel to said inside surfaces of said temple on which it is mounted, wherein said second pair of magnets each include a flat magnetically engaging surface portion, and wherein said attachment frame includes a pair of wire members extending outwardly therefrom and mechanically supporting said second pair of magnets at a position that will permit said flat magnetically engaging surfaces of said first and second pairs of magnets to engage each other and hold said attachment frame in place on said eyeglass frame, said pair of wire members being positioned on said attachment frame so as to rest on said temples, respectively, when said first and second pairs of magnets engage each other to thereby provide additional mechanical support for said attachment frame.

5. A combination eyeglass and attachment lens as defined in claim 1, wherein said eyeglass frame and said attachment frame each include two rim portions for mounting said eyeglass and attachment lens therein, respectively, and a bridge member is connected to said two rim portions and extends therebetween, said bridge member on the attachment frame being positioned relative to said second pair of magnets to engage said bridge member on said eyeglass frame when said first and second pairs of magnets are magnetically engaged.

6. A combination eyeglass and attachment lens selectively mountable thereon, comprising:

(a) an eyeglass frame formed with two rims portions each having a primary lens mounted therein, and a bridge member connected to said rim portions and extending therebetween;

(b) a pair of temples mounted at the sides of said eyeglass frame and arranged to extend rearwardly therefrom for holding said eyeglass frame on the head of a user, each of said temples including a generally flat inside surface portion;

(c) a first pair of magnets mounted on the said inside surface portions of said temples, respectively, with each of said first pair of magnets having a generally flat surface portion and being mounted on one of said temples with said generally flat surface portion lying in a plane generally parallel to said inside flat surface of said temple;

(d) an attachment frame formed with two rims portions each having an auxiliary lens mounted therein, and a bridge member connected to said rim portions and extending therebetween, said attachment frame bridge portion having a first engagement portion for engaging the top edge portion of said eyeglass frame bridge member and a second engagement portion extending generally perpendicularly downwardly from said first portion to engage the back side of said bridge member of said eyeglass frame; and (e) a second pair of magnets mounted in a pair of wire members extending outwardly from the ends of said attachment frame with each of said second pair of magnets including a generally flat surface portion;

(f) said bridge member of said attachment frame is positioned relative to said second pair of magnets on said attachment frame to cause said first and second engagement portions on said attachment frame bridge member to engage said top and back sides of said eyeglass frame bridge member when said generally flat surfaces of said first and second pair of magnets magnetically engage each other to thereby provide said attachment frame with a secure mounting on said eyeglass frame; and said wire members being positioned on said attachment frame so as to rest on said eyeglass frame when said first and second pairs of magnets engage each other to thereby provide additional mechanical support for said attachment frame.

\* \* \* \* \*